US012331833B2

(12) United States Patent
Leach et al.

(10) Patent No.: US 12,331,833 B2
(45) Date of Patent: Jun. 17, 2025

(54) SLIP COAT FOR AN ELASTOMER

(71) Applicant: Global Supply Innovative Engineering, LLC, Troy, MI (US)

(72) Inventors: Randall Leach, Troy, MI (US); Shawn O'Neill, Troy, MI (US); Paul Snowwhite, Dexter, MI (US)

(73) Assignee: GLOBAL SUPPLY INNOVATIVE ENGINEERING, LLC, Troy, MI (US)

( * ) Notice: Subject to any disclaimer, the term of this patent is extended or adjusted under 35 U.S.C. 154(b) by 102 days.

(21) Appl. No.: 18/472,463

(22) Filed: Sep. 22, 2023

(65) Prior Publication Data

US 2025/0102063 A1   Mar. 27, 2025

(51) Int. Cl.
| F16J 15/02 | (2006.01) |
| C08K 3/36 | (2006.01) |
| C08K 7/28 | (2006.01) |
| C09D 163/00 | (2006.01) |
| F16J 15/3284 | (2016.01) |
| B60J 10/17 | (2016.01) |

(52) U.S. Cl.
CPC .......... *F16J 15/022* (2013.01); *C09D 163/00* (2013.01); *F16J 15/3284* (2013.01); *B60J 10/17* (2016.02); *C08K 3/36* (2013.01); *C08K 7/28* (2013.01)

(58) Field of Classification Search
CPC ....... F16J 15/022; F16J 15/3284; B60J 10/17; C09D 163/00; C09D 163/10; C08K 3/36; C08K 7/28
See application file for complete search history.

(56) References Cited

U.S. PATENT DOCUMENTS

| 5,473,840 | A | * | 12/1995 | Gillen | ...................... B60J 10/74 49/408 |
| 5,505,023 | A | * | 4/1996 | Gillen | .................... B60J 1/1853 49/408 |
| 6,136,880 | A | * | 10/2000 | Snowwhite | ........... C03C 25/106 428/383 |
| 6,359,025 | B1 | * | 3/2002 | Snowwhite | ........... C03C 25/106 522/182 |
| 6,438,306 | B1 | * | 8/2002 | Bishop | .................. C03C 25/106 385/128 |
| 6,591,552 | B1 | * | 7/2003 | Rasmussen | ........... E05F 11/535 49/121 |
| 6,691,464 | B2 | * | 2/2004 | Nestell | ................... B60J 1/1861 49/374 |

(Continued)

FOREIGN PATENT DOCUMENTS

| CN | 101563234 A | * | 10/2009 | ................ B41J 2/01 |
| WO | WO-2009120818 A1 | * | 10/2009 | ............. B60J 10/16 |
| WO | WO-2018045866 A1 | * | 3/2018 | ............. C08G 77/46 |

*Primary Examiner* — Nicholas L Foster
(74) *Attorney, Agent, or Firm* — Vivacqua Crane, PLLC

(57) ABSTRACT

A slip coat composition, a gasket, and a method forming a gasket including a slip coat. The slip coat composition includes an ultra-violet light cationic curable coating composition including hollow glass microspheres and micronized silica. The gasket includes a seal having an exposed surface on which the slip coat is disposed. A base layer defining a first channel is injection molded and a seal is injection molded onto the base layer at least partially within the first channel. The seal includes an exposed surface which exhibits a texture. The slip coat composition is applied to the exposed surface of the seal and cured.

20 Claims, 5 Drawing Sheets

(56) References Cited

U.S. PATENT DOCUMENTS

| | | | | |
|---|---|---|---|---|
| 6,955,009 | B2* | 10/2005 | Rasmussen | E05F 11/535 49/118 |
| 7,003,916 | B2* | 2/2006 | Nestell | E05D 15/0621 49/125 |
| 7,073,293 | B2* | 7/2006 | Galer | E05F 15/643 49/413 |
| 7,276,543 | B2* | 10/2007 | Bishop | C03C 25/106 522/182 |
| 9,523,059 | B2* | 12/2016 | Kunishima | C08J 7/043 |
| 11,938,793 | B2* | 3/2024 | Snider | B29C 45/0053 |
| 2003/0063882 | A1* | 4/2003 | Bishop | C09D 4/06 385/128 |
| 2003/0100627 | A1* | 5/2003 | Bishop | C03C 25/106 522/153 |
| 2003/0188487 | A1* | 10/2003 | Rasmussen | E05F 15/643 49/118 |
| 2003/0213179 | A1* | 11/2003 | Galer | B60J 1/1861 49/413 |
| 2016/0068779 | A1* | 3/2016 | Kunishima | F16J 15/324 508/106 |
| 2020/0290443 | A1 | 9/2020 | Snider et al. | |
| 2023/0183417 | A1* | 6/2023 | Cui | C08K 3/36 528/89 |
| 2024/0227527 | A1* | 7/2024 | Snider | B29C 45/14434 |

* cited by examiner

SLIP COAT FOR AN ELASTOMER

FIELD

The present disclosure relates to a slip coat for an elastomer, and in particular embodiments a gasket system including a slip coat for moveable panels.

INTRODUCTION

Windows are used in vehicles to provide ventilation in the passenger cabin and storage areas. Sliding windows are commonly used, e.g., in the rear windows of trucks and may include two or more window panels, wherein one of the panels slides relative to the other panels. Like other moveable windows, sliding windows may be moved manually or by a motor and the window may be supported by and ride on rails. Seals are often used with moveable windows to keep out the elements, e.g., rain and wind, when the moveable window is closed making the windows relatively air and watertight.

Sometimes, however, a seal sticks to a movable window or surrounding surfaces, requiring relatively high forces to move the window. If the window is moved using a motor, sticking may negatively impact the motor. If the window is moved manually, sticking may cause the operator to use excessive force in opening the window, which may damage the window. In addition, sticking may cause wear of the seal, reducing the service life of the seal.

Thus, while seals achieve their intended purpose, there is a need for new and improved seal designs and methods of forming seals.

SUMMARY

According to various aspects, the present disclosure relates to a slip coat composition. The slip coat composition includes an ultra-violet light cationic curable coating composition including hollow glass microspheres and micronized silica. In embodiments, the slip coat composition includes a polymer resin including at least one functional group curable upon exposure to ultraviolet radiation present in the slip coat composition in a range of 20 percent by weight to 25 percent by weight of the total weight of the slip coat composition. The slip coat composition also includes a flexibilizer present in a range of 1 percent to 20 percent by weight of the total weight of the slip coat composition. The slip coat composition further includes a reactive diluent present in a range of 2 percent by weight to 15 percent by weight of the total weight of slip coat composition. The slip coat composition yet further includes a surface tension modifier present in the range of 0.5 percent by weight to 5 percent by weight of the total weight of the slip coat composition. In addition, the slip coat composition includes a photoacid generator present in a range of 0.5 percent by weight to 5 percent by weight of the total weight of the slip coat composition. The slip coat composition also includes hollow glass microspheres having a particles size range of 1 micrometer to 20 micrometers present in a range of 5 percent by weight to 10 percent by weight of the total weight of the slip coat composition and micronized silica having a particles size range of 1 micrometer to 20 micrometers, present in a range of 5 percent by weight to 15 percent by weight of the total weight of the slip coat composition. The slip coat composition yet also includes an organic solvent present in the range of 40 percent to 50 percent by weight of the total weight of the slip coat composition.

In embodiments of the above, the hollow glass microspheres and micronized silica in a weight ratio in the range of 0.5 to 1 to 0.7 to 1.

In any of the above embodiments, the polymer resin includes a bisphenol-A epoxy resin, the flexibilizer includes polyethylene glycol; the reactive diluent includes triethylene glycol divinyl ether; the surface tension modifier includes polyether modified polydimethylsiloxane, and the photoacid generator includes triphenylsulfonium hexafluroantimonate. In further embodiments, the polyethylene glycol has a molar mass in the range of 380 nm to 420 nm.

In any of the above embodiments, the organic solvent includes isopropyl alcohol.

In any of the above embodiments, the coating includes an optical brightener.

According to various additional aspects, the present disclosure relates to a gasket. The gasket includes a seal, wherein the seal includes an exposed surface. Further, a slip coat is disposed on the exposed surface. The slip coat includes any of the above described slip coat compositions.

In embodiments of the above, the seal includes a thermoplastic elastomer.

In any of the above embodiments, the exposed surface of the seal exhibits a texture. In further embodiments, the texture exhibits a depth in the range of 5 micrometers to 50 micrometers.

In any of the above embodiments, the slip coat is in the range of 1 micrometer to 50 micrometers in thickness.

In any of the above embodiments, the base layer includes a first channel defined therein, wherein the seal is retained in the first channel. In further embodiments, the base layer includes polypropylene.

According to various further embodiments, the present disclosure relates to a method of preparing a gasket. The method includes injection molding with a textured mold cavity a seal, wherein the seal includes an exposed surface which exhibits a texture. The method further includes cleaning the exposed surface of the seal. The method also includes applying a slip coat composition, and curing the slip coat composition. In any of the above embodiments, prior to curing, the slip coat composition includes a slip coat composition according to any of the above embodiments.

In embodiments of the above, the method further includes evaporating at least a portion of the organic solvent.

In any of the above embodiments, curing the slip coat composition includes exposing the slip coat composition to an ultra-violet (UV) light having at least one or more wavelengths in the range of 280 nm to 400 nm and at a dosage of 2,500 $mJ/cm^2$ to 3,500 $mJ/cm^2$.

In any of the above embodiments, the slip coat composition includes an optical brightener and the method further includes measuring the thickness of the slip coat composition after curing the slip coat composition by applying light in at least one wavelength in the range of 280 nm to 380 nm incident to the slip coat, and detecting light reflected from the cured slip coat composition by an optical sensor in at least one wavelengths in the range of 380 nm to 500 nm.

BRIEF DESCRIPTION OF THE DRAWINGS

The drawings described herein are for illustration purposes only and are not intended to limit the scope of the present disclosure in any way.

DETAILED DESCRIPTION

Figure 1A:
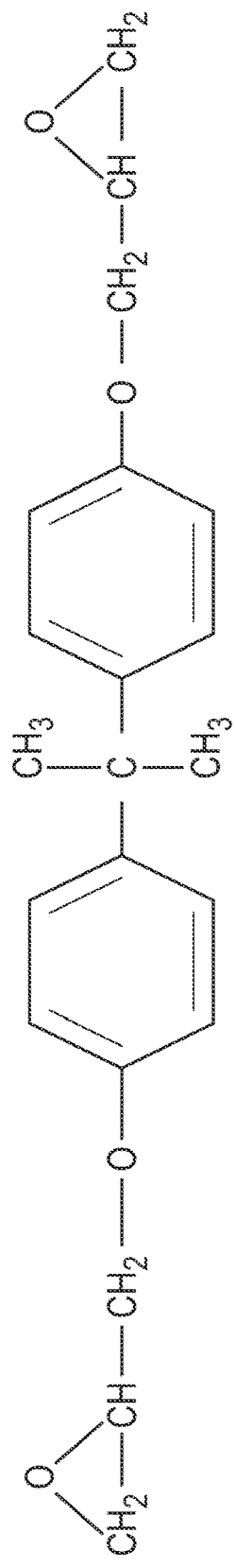
FIG. 1A illustrates a general formula for a cycloaliphatic epoxy according to embodiments of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

The present disclosure relates to a slip coat compositions, seals including the slip coat, gasket systems including the slip coat, gasket systems including the slip coat for use with moveable windows in window assemblies, and methods of forming gasket systems including the slip coat. The slip coat composition is selected for its adhesion to the seal as well as the ability of the slip coat to reduce the static and dynamic friction a movable window sliding repeatedly against the seal. The composition is also selected based on the gloss exhibited by the slip coat as applied to the seal.

Figure 1B:
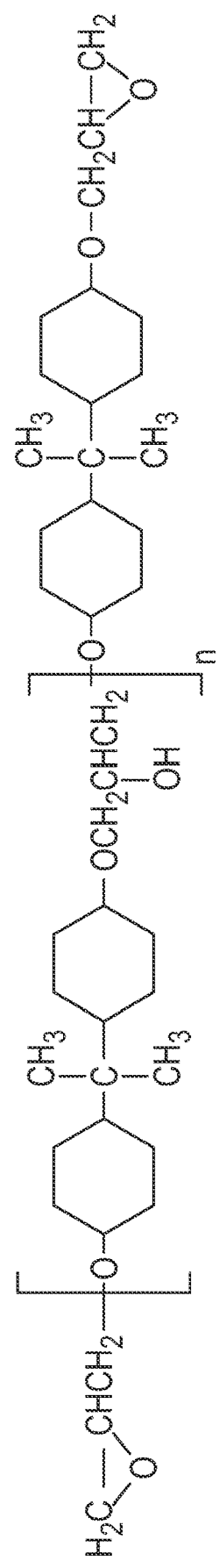
FIG. 1B illustrates a general formula for bisphenol-A epoxy according to embodiments of the present disclosure.
Figure 1C:
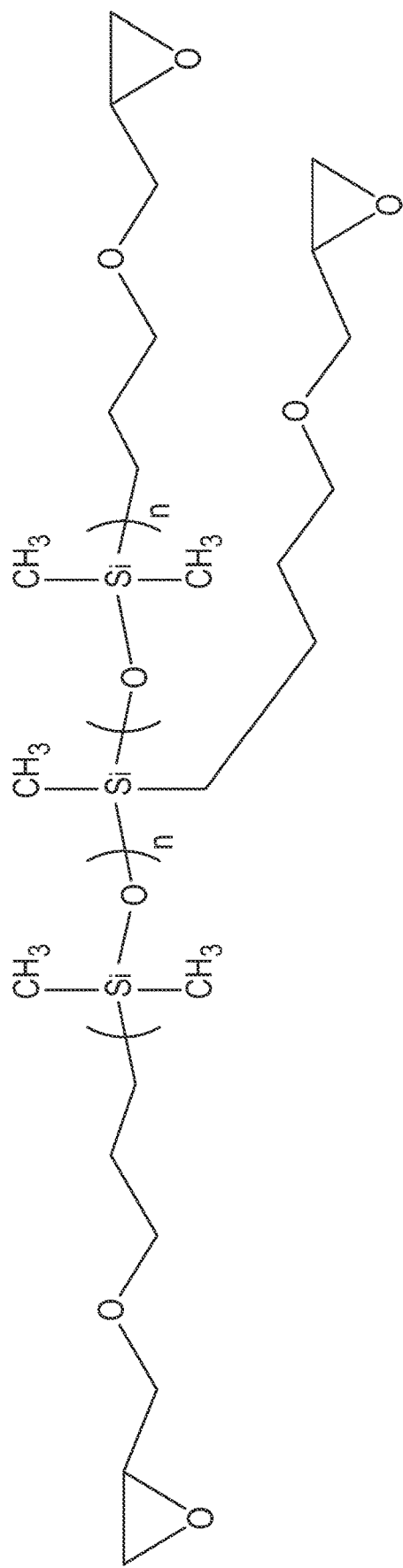
FIG. 1C illustrates a general formula for an epoxy functionalized PMDS according to embodiments of the present disclosure.
Figure 1D:
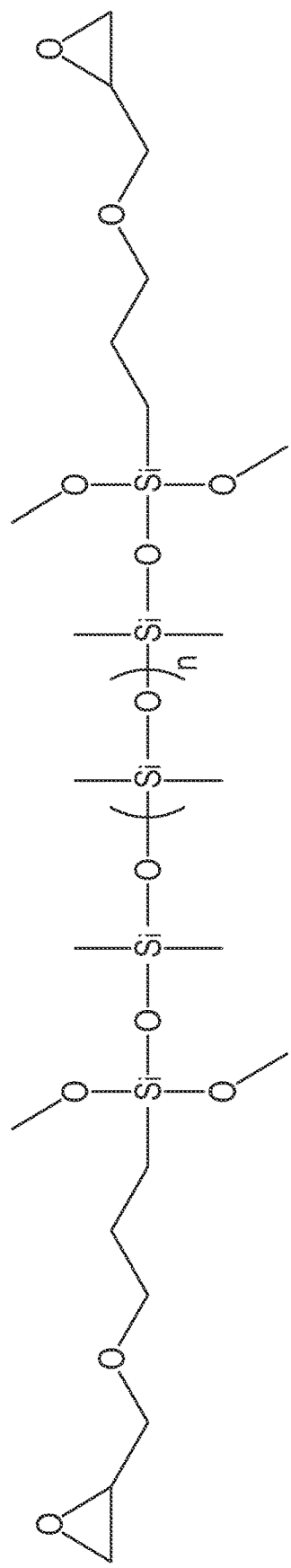
FIG. 1D illustrates a general formula for an epoxy functionalized PMDS according to embodiments of the present disclosure.

The slip coat is a radiation curable coating including hollow glass microspheres and micronized silica. In embodiments, the radiation curable coating is a cationic ultraviolet radiation (UV) curable coating including a cationic ultraviolet curable resin, wherein the polymer includes at least one functional group curable upon exposure to ultraviolet radiation. In embodiments, the ultraviolet curable resin includes an acrylate resin or a silicone resin. The acrylate resin includes an epoxy based resin, such as a bisphenol-A (BPA) epoxy exhibiting the general structure illustrated in FIG. 1A or a cycloaliphatic epoxy such as hydrogenated bisphenol-A epoxy exhibiting the general structure illustrated in FIG. 1B, having an number average molecular weight of less than 1,000, including all values and ranges therein, such as in the range of 200 to 800, or an epoxy functionalized polydimethylsiloxane (PDMS), such as PDMS functionalized with two or three epoxy groups exhibiting the general structure illustrated in FIGS. 1C and 1D, having a number average molecular weight in the range of 7,000 or less, including all values and ranges therein such as 300 to 6,000, including all values and ranges therein. Alternatively, the UV curable coating may be a urethane acrylate resin or a polybutadiene acrylate resin used in combination with difunctional and trifunctional acrylate ester monomers.

The resin is present in the range of 20 percent by weight to 25 percent by weight of the total weight of the slip coat composition, including all values and ranges therein.

The slip coat includes various modifiers. For example, the coating includes a flexibilizer, which is understood to improve the impact and fracture properties of the coating. The flexiblizer may include, for example, compounds having a hydroxyl value in the range of 200 to 350 and a molar mass in the range of 350 grams per mol to 450 grams per mol. In embodiments, the flexibilizer includes polyethylene glycol. The polyethylene glycol exhibits a molar mass in the range of 380 grams per mol to 420 grams per mol, such as polyethylene glycol 400 and a hydroxyl value in the range of 264 to 300. The flexibilizer may be present in the range of 1 percent to 20 percent by weight of the total weight of the slip coat composition, including all values and ranges therein, such as 5 percent to 15 percent by weight of the slip coat composition.

In addition, a reactive diluent is added to the coating, such as triethylene glycol divinyl ether. Alternatively, or additionally, the reactive diluents may include one or more of diglycidyl ether of 1,4-butanediol, glycerol triglycidyl ether, and 2-ethylhexyl glycidyl ether, or other epoxies. The reactive diluent is present in the range of 5 percent to 15 percent by weight of the slip coat composition, including all values and ranges therein.

A surface tension modifier, which in embodiments includes a polyether modified polydimethylsiloxane, may also be added to the slip coat composition. The polyether modified polydimethylsiloxane may exhibit a number average molecular weight in the range of 500 to 8,000. The polyether modified polydimethylsiloxane is present in the range of 0.05 percent to 2 percent of the slip coat composition, including all values and ranges therein. One such polyether modified polydimethylsiloxane includes BYK333, available from BYK. The surface tension modifier is understood to increase wetting of the slip coat composition and prevent the formation of defects such as orange peel or pits in the coating.

The slip coat also includes a photoacid generator such as triphenylsulfonium hexafluroantimonate (TPSHFA). Additional or alternative photoacid generators include, for example, triphenylsulfonium perfluoro-1-butanesufonate, diphenyliodonium p-toluenesulfonate, and diphenyliodonium hexafluorophosphate. The photoacid generator is present in the range of 0.5 percent to 5 percent by weight of the total weight of the slip coat composition, including all values and ranges therein.

Further, a silane coupling agent including vinyl, epoxy, amino, or mercapto functional groups, such as vinylbenzyl-N,N-dimethyl-N-(2-aminoethyl) silane, is used in embodiments of the compositions. Additionally or alternatively, silane coupling agents may include, e.g., dimethoxy methyl vinyl silane. The silane coupling agent is present in the range of 0.1 percent to 3 percent by weight of the total weight of the slip coat composition, including all values and ranges therein. The silane coupling agent may be used to disperse fillers in the slip coat.

At least two fillers are also included in the slip coat composition. The fillers include hollow glass microspheres and micronized silica having a particles size range of 1 micrometer to 20 micrometers, including all values and ranges therein. In embodiments, the fillers exhibit particle sizes in the range of 1 microns to 15 microns, including all values and ranges therein, such as 3 microns to 18 microns, as measured by, e.g., laser diffraction particle size analysis. The hollow glass microspheres are present in a range of 5 percent by weight to 10 percent by weight of the total weight of the slip coat composition, including all values and ranges therein, and the micronized silica is present in a range of 5 percent by weight to 15 percent by weight of the total weight of the slip coat composition, including all values and ranges therein. Additional fillers may optionally be added including talc, calcium carbonate, and fumed silica. The additional fillers may have a particle size of less than 1 micrometer, such as in the range of 0.1 micrometer to 10 micrometers. In embodiments, the composition includes a combination of hollow glass microspheres and micronized silica in a weight ratio in the range of 0.5 to 1 to 0.7 to 1, including all values and ranges therein. Without being bound to any particular theory, the fillers provide localized features that prevent full contact between the surface of the seal 124 and the moveable window panel 104, reducing static and sliding friction.

The fillers also, optionally, include an optical brightener or other reflective agent that reflect incident light in wavelengths in the UV spectrum, i.e., exhibiting a wavelength in the range of 280 nm to 380 nm, including all values and ranges therein. Such brighteners include stilbenes and biphenyls. The reflected light may be reflected at wavelengths in the UV spectrum or at visible wavelengths, such as in the range of 380 nm to 500 nm, including all values and ranges therein.

Further, in embodiments, a slip agent, such as carnauba wax, is included in the slip coat composition. Carnauba wax is present in the range of 1 percent to 10 percent by weight of the total weight of the slip coat composition, including all values and ranges therein. Further, in embodiments, an antioxidant may be present, wherein the antioxidant may include at least one of sterically hindered phenols and thioesters, such as Irganox 1010 available from BASF.

The slip coat composition is carried and applied in an organic solvent present in the range of 40 percent to 50 percent by weight of the total weight of the slip coat composition, including all values and ranges therein. In embodiments, the organic solvent includes isopropanol. Alternatively, or additionally, other organic solvents may be used such as acetone, acetic acid, t-butyl alcohol, ethanol, and ethylene glycol.

The various components of the slip coat formulation described above are present at a total amount of 100 percent weight. In particular embodiments, the slip coat composition includes an epoxy acrylate and, optionally, an epoxy-functionalized polydimethylsiloxane present with the flexibilizer; reactive diluent; surface tension modifier; UV photoacid generator; and micronized silica and glass bead fillers; all carried by the organic solvent.

The slip coat composition may be formulated by mixing the various components, i.e., the resin, modifiers, fillers, etc., shielded from light, and particularly light having wavelengths in the near ultraviolet, ultraviolet spectrum including in the range of 280 nm to 400 nm, including all values and ranges therein. In embodiments, the fillers may be added to the slip coat composition after the remaining ingredients are added. The slip coat composition may then be stored in a light blocking container or applied to a seal.

In various embodiments, the slip coat composition is coated onto a seal by a coating process, such as rolling, wiping, spraying, or dip coating. In embodiments, after applying the coating composition to the seal, the organic solvent may be allowed to evaporate. Depending on the organic solvent, heat may be applied to the slip coat composition to assist in evaporation of the solvent. The slip coat composition is then cured by exposing the coating to radiation, such as in the form of light having wavelengths in the near ultraviolet, ultraviolet spectrum including in the range of 280 nm to 400 nm, including all values and ranges therein. Additionally, or alternatively, to the exposure of radiation, heat may be used to cure the coating. Accordingly, the seal includes the slip coat composition described above after at least a portion of the solvent has evaporated and the composition is cured.

The seal, to which the slip coat may be applied and adheres to, includes natural rubber or a synthetic rubber, such as a thermoplastic elastomer. Thermoplastic elastomers that may be used for forming the seal include, for example, ethylene propylene diene monomer rubber and blends of ethylene propylene diene monomer rubber with other polymers such as ethylene propylene diene monomer rubber and polypropylene, high density polyethylene, natural rubber, nylon, butadiene-styrene, and ethylene-octene elastomer. Examples include SANTOPRENE, available from Celanese, ROYALTHERM EPDM from Lion Elastomers, SARLINK TPV from Teknor Apex, and VISTALON EPDM from ExxonMobil. In embodiments, the seal exhibits a durometer in the range of 40 to 70 Shore A, including all values and ranges therein, as measured in accordance with ASTM D2240-15 (2021). In addition, in embodiments of the above, the seal exhibits a compression set in the range of 10 percent to 50 percent at 73° C. and 22 hours, including all values and ranges therein, as measured in accordance with ASTM D395-18.]

The slip coat is relatively stiffer and less flexible than the seal, causing the slip coat prone to cracking with flexing of the seal. Accordingly, to assist in adhering the slip coat to the seal, and prevent cracking of the slip coat, a texture is formed in the surfaces of the seal. In embodiments, the texture is imparted by forming the seal in an etched mold cavity. The mold cavity may be etched using a laser etching or chemical etching process. The etching process produces a texture that exhibits a depth in the range of 5 micrometers to 50 micrometers, including all values and ranges therein. The etching increases the surface area for bonding the slip coat to the seal. To measure adhesion, a fold test was employed, where a portion of the coated seal was folded over 180 degrees repeatedly in accordance with ASTM D3359-17.

In various embodiments, the seal is used as a gasket or in a gasket system and, in particular embodiments, in a gasket system for a window assembly with a moveable window panel. The slip coat allows the moveable panel to slide relative to the seal from a first, closed position to a second, open position. When in the closed position, the seal contacts the moveable panel and closes the gaps between the panel and the remainder of the window assembly. In shifting from the closed to open position, the moveable panel may contact at least a portion of the seal. The slip coat reduces sticking of the moveable window panel sticking to the seal, and the static and dynamic friction of the moveable window panel on the seal, cracking of the seal, or fatigue of the seal. In the window assembly described herein, the seal, including the slip coat, exhibited abrasion resistance after 10,000 to 15,000 open and close cycles.

The seals and gasket systems including the slip coat described herein may be used in a variety of applications including, but not limited to, vehicle passenger compartment windows. The seals and gasket systems may also be used in, e.g., vehicles including cars and trucks, marine, aircraft, locomotive, construction, and agricultural applications as well as in storage compartment windows, and other windows including interior and exterior building windows of various size, such as sliding windows and sliding door windows, sliding windows for hunting blinds, and sliding windows for other enclosures. Further, the moveable window panels may be formed from one or more of glass, polycarbonate, acrylic, and ceramic. In embodiments, the remainder of the window may be formed from glass, thermoplastic polymer, metals, metal alloys, or other materials.

Figure 2:
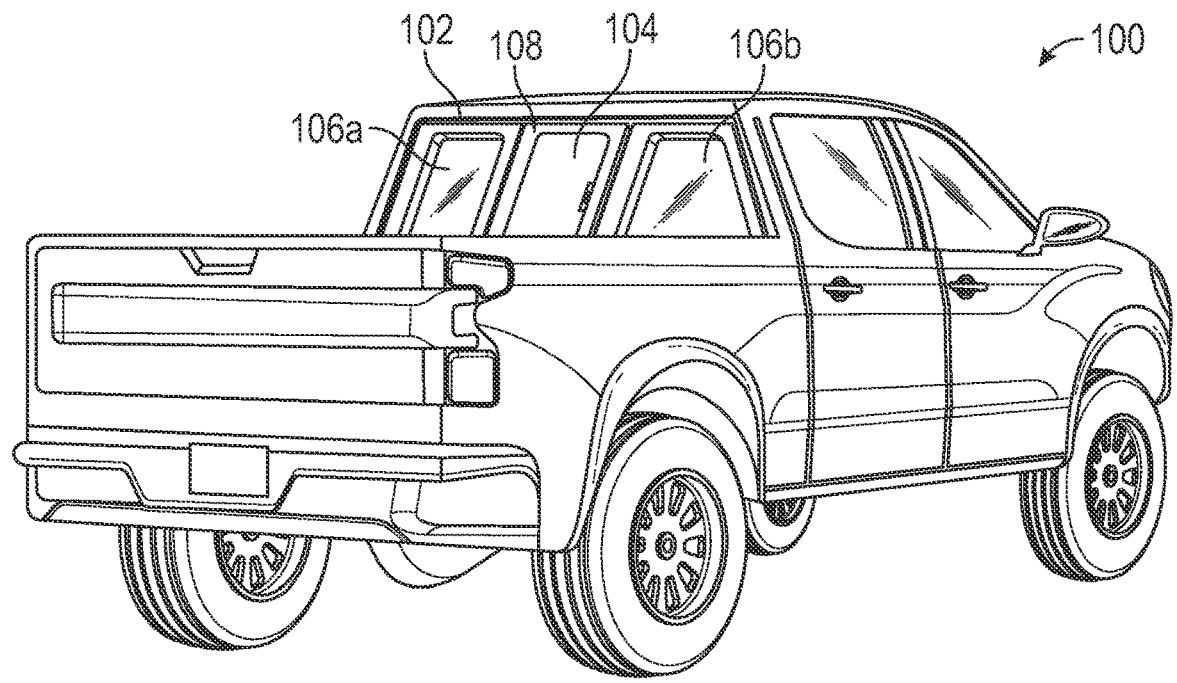
FIG. 2 illustrates a rear perspective view of a truck including a rear sliding window according to embodiments of the present disclosure.

FIG. 2 illustrates a rear view of the exterior of a truck 100 including a rear window 102 including the gasket system. The rear window 102 includes a moveable window panel 104. The rear window 102 may also include two window panels 106a, 106b defining opening 108 between the window panels 106a, 106b as illustrated. The moveable window panel 104 moves relative to the opening 108, such as from a first closed position where the moveable window panel 104 covers the opening 108 to a second open position where the moveable window panel 104 at least partially uncovers the opening 108. Alternatively, the rear window 102 may including a single panel defining the opening 108, which the moveable window panel 104 moves relative to. In another alternative embodiment, the rear window may include two window panels, wherein at least one of the two window panels is a moveable window panel 104 that slides relative to the other window panel, revealing an opening.

Figure 3:
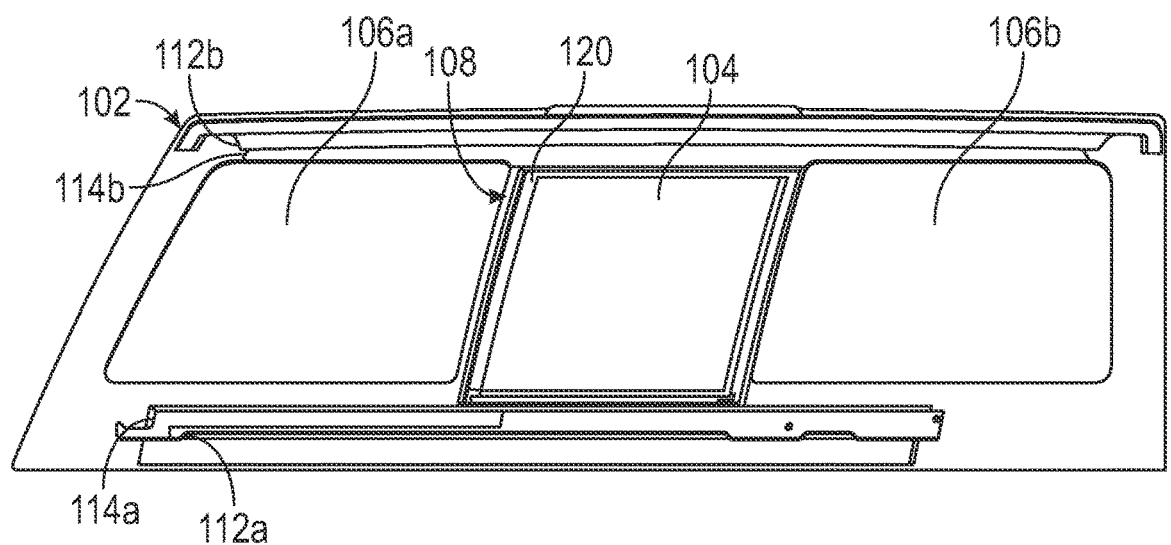
FIG. 3 illustrates a perspective view of a rear sliding window from the interior of the truck according to embodiments of the present disclosure.
Figure 4A:
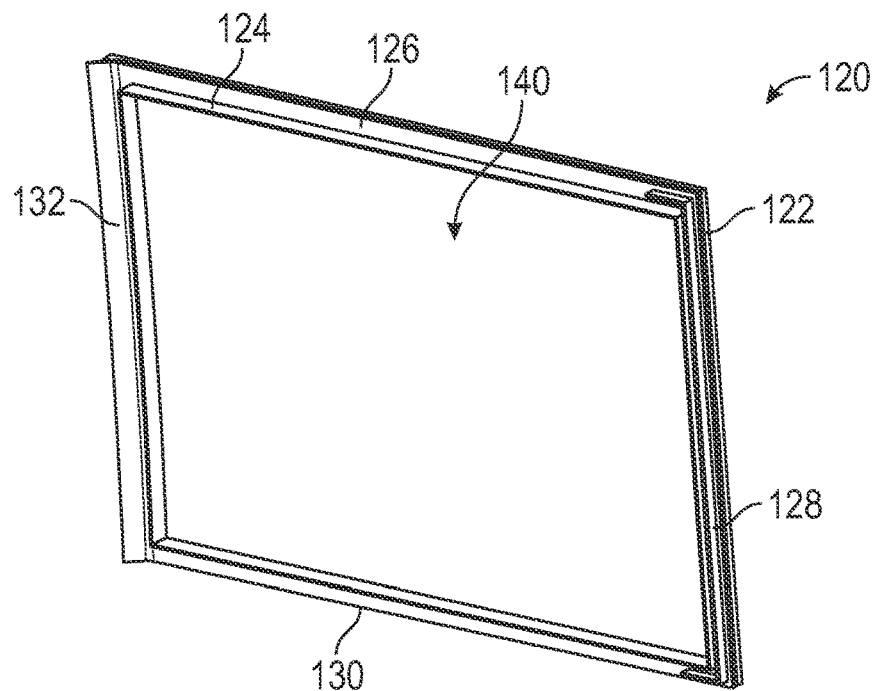
FIG. 4A illustrates a side perspective view of a gasket from a first side according to embodiments of the present disclosure.

FIG. 3 illustrates a view of the rear window 102 interior of the truck including the two window panels 106a, 106b defining an opening 108 and the moveable window panel 104 covering the opening 108. The rear window 102 includes two tracks, a lower track 112a affixed to the window, or proximal to the window, below the opening 108, and an upper track 112b affixed to the window, or proximal to the window, above the opening 108. The lower track 112a defines a lower channel 114a and the upper track 112b defines an upper channel 114b. As illustrated in FIGS. 4A and 4C, the channels 114a, 114b are formed by the tracks 112a, 112b. Alternatively, the channels 114a, 114b are formed by the tracks 112a, 112b and the rear window 102. The moveable window panel 104 is slidable on the tracks 112a and 112b between the first, closed position and the second, open position. In embodiments, the moveable window panel is manually slid or is slid using a linear actuator.

Surrounding the opening 108 is a gasket 120 for sealing the moveable window panel 104. The gasket 120 is affixed to the rear window 102 around the perimeter of the opening 108. When the moveable window panel 104 is positioned in the first, closed position, the gasket 120 seals around the perimeter of the moveable window panel 104. In this context, sealing the moveable window panel 104 may be understood as making the moveable window panel 104 watertight. In aspects, the gasket 120 may also make the moveable window panel 104 gas tight. As the moveable window panel 104 moves back and forth, it contacts and slides against the gasket 120.

Figure 4B:
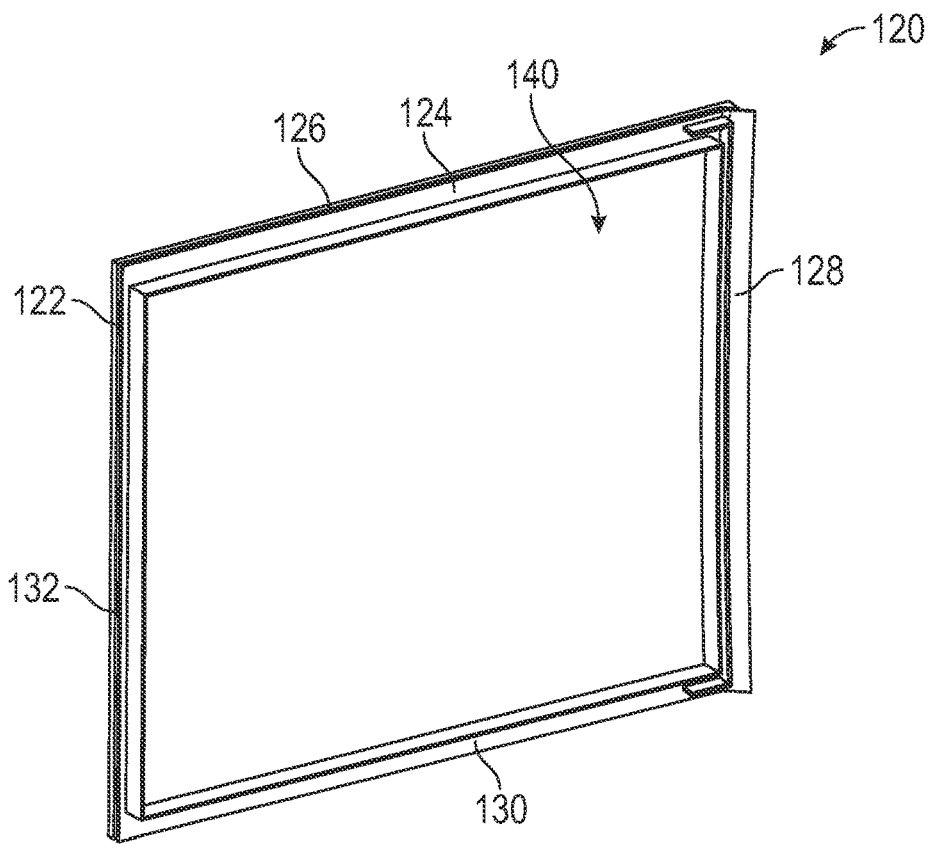
FIG. 4B illustrates a side perspective view of a gasket from the opposite side according to embodiments of the present disclosure.
Figure 4C:
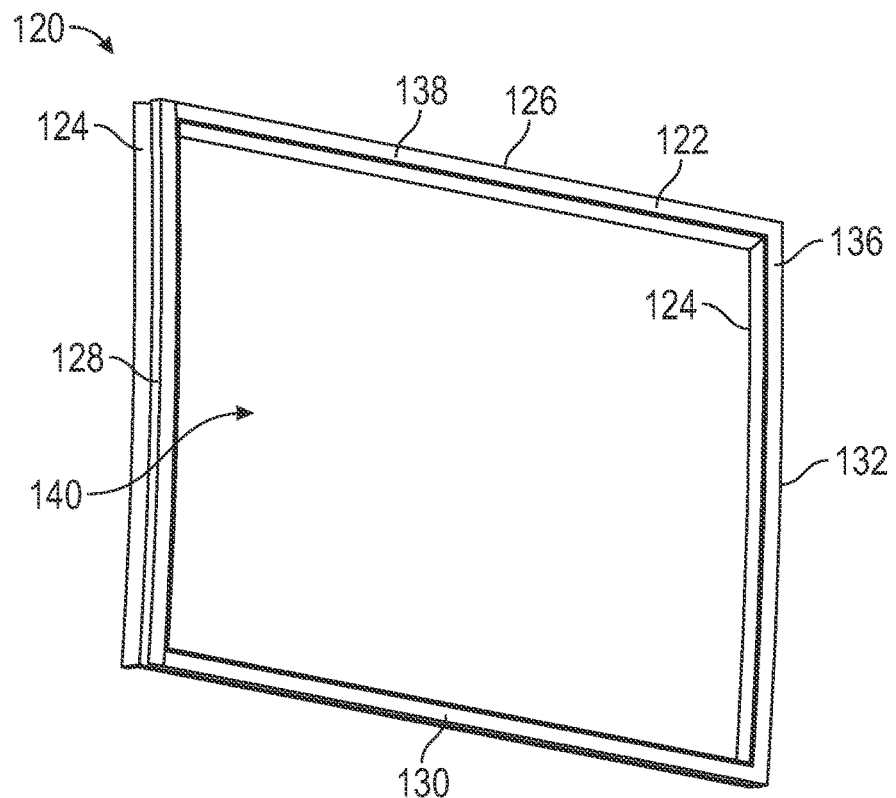
FIG. 4C illustrates a rear view of the gasket according to embodiments of the present disclosure.

With reference to FIGS. 4A through 4C, the gasket 120 includes a base layer 122 and a seal 124 including the slip coat disposed on the exposed surfaces of the seal 124. The base layer 122 is formed from a thermoplastic material. In aspects, the thermoplastic material includes polypropylene and, in embodiments, the polypropylene is reinforced with one or more of the following fillers: glass fiber, carbon fiber, calcium carbonate, graphite, and aluminum powder. Additionally or alternatively, the thermoplastic material may include one or more of the following high density polyethylene, polyetherimide, polyphenylene sulfide, polycarbonate and acrylic, which may also be filled with the previously mentioned reinforcing fillers. The seal 124 is formed from the seal materials previously noted.

The seal 124 may be molded onto a first channel defined in the base layer 122 using a process such as two shot injection molding, or over molding by way of injection molding, where first the base layer 122 is injection molded and then the seal 124 is injection molded onto the base layer 122. In alternative embodiments, either one of the base layer 122 or seal 124 may be extruded or processed using an alternative plastics processing technique. In embodiments, the base layer 122 and seal 124 are mechanically interlocked together to prevent lifting of the seal 124 from the base layer 122. In additional, or alternative, embodiments, an adhesive may be applied to the base layer 122 prior to molding the seal 124.

The gasket 120 may be formed from one or more legs, each leg having a base layer 122 and a seal 124. As illustrated in FIGS. 4A and 4B, the gasket 120 includes four legs or sections: first leg 126, a second leg 128, a third leg 130, and a fourth leg 132. In addition, while the gasket 120 is illustrated as exhibiting a generally rectangular shape defining an opening 140 therein, the gasket 120 may assume a number of shapes, such as a linear or curvate line, square, triangular, octagonal, circular, etc. Further, the legs may be continuous, shaped from a single piece, or, alternatively, the legs may be joined together, such as at the ends of each leg, to form the gasket 120.

Figure 5:
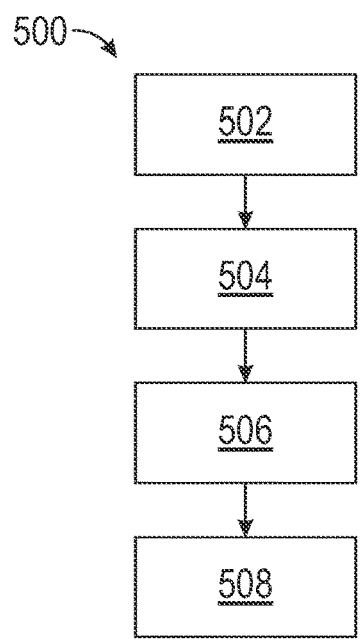
FIG. 5 illustrates a method of forming a gasket according to embodiments of the present disclosure.

Reference is now made to FIG. 5, and with further reference to FIGS. 3A through 4D, illustrating a method 500 of forming the gasket 120 including a slip coat as described herein. The method 500 includes at block 502 injection molding the base layer 122 and injection molding the seal 124 onto the base layer 122, such as within a first channel defined by the base layer 122, by an injection molding process such as two-shot molding or over molding. While molding the seal 124 a texture is imparted in the exposed surfaces of the seal 124 by using a mold that incorporates the texture described above in the mold cavity for forming the seal 124.

At block 504, the exposed surface of the seal 124 is cleaned using one or more of the following methods. After molding the seal 124, the gasket 120 may be allowed to rest for 24 to 72 hours to allow the elastomer to outgas, where trapped gas and vapor are released from the seal 124 and base layer 122 (if present). In addition, or alternatively, the seal 124 may be wiped with a chemical wipe, using a solvent such as isopropyl alcohol or any of the above mentioned organic solvents. In addition or alternative to any of the previously mentioned methods, the exposed surface of the seal 124 may be oxidized using flame treatment, atmospheric/air plasma treatment, or dielectric barrier discharge.

At block 506, the slip coat is then applied using one or more of the following coating processes: rolling, wiping, spraying. Or dip coating, as previously mentioned above. The slip coat is applied to the seal 124 at a thickness in the range of 1 micrometer to 50 micrometers, including all values and ranges therein. In embodiments, the slip coat is then allowed to rest for up to 20 minutes, such as in the range of 1 minute to 20 minutes, including all values and ranges therein. During this time, the carrier evaporates from the slip coat. At block 508, the slip coat composition is then UV cured by exposing the coating to a UV light source. In additional or alternative embodiments, the slip coat may be heat cured. UV curing may be performed at a dosage of 2,500 mJ/cm$^2$ to 3,500 mJ/cm$^2$, including all values and ranges therein, at one or more wavelengths in the range of 280 nm to 400 nm on the electromagnetic spectrum.

If optical brighteners are present in the slip coat composition, at block 508 the thickness of the coating may be verified by reflecting light off the coating, wherein the incident light is in the UV spectrum, such as from 280 nm to 380 nm and the detected light is measured by an optical sensor in the wavelengths noted above, i.e., 380 nm to 500 nm. The finished parts are then staged for 1 minute to 20 minutes prior to packaging.

Accordingly, the slip coat, seals, gasket systems, and methods described herein offer many advantages. Such advantages include reducing sliding friction of the glass relative to the seal in the gasket systems and window assemblies described herein by as much as 75 percent as compared to gasket systems including the seal without the slip coat. These advantages also include, for example, allowing the moveable window panel to slide without sticking, while providing a watertight, and in some embodiments, an airtight seal. These advantages further include enabling the gasket system described herein to pass durability testing of 10,000 to 15,000 open/closing cycles of the movable window against the seal including the slip coat.

The description provided herein is merely exemplary in nature and variations that do not depart from the gist of the present disclosure are intended to be within the scope of the present disclosure. Such variations are not to be regarded as a departure from the spirit and scope of the present disclosure.

What is claimed is:

1. A slip coat composition, comprising:
   a polymer resin including at least one functional group curable upon exposure to ultraviolet radiation present in the slip coat composition in a range of 20 percent by weight to 25 percent by weight of the total weight of the slip coat composition;
   a flexibilizer present in a range of 1 percent to 20 percent by weight of the total weight of the slip coat composition;
   a reactive diluent present in a range of 2 percent by weight to 15 percent by weight of the total weight of slip coat composition;
   a surface tension modifier present in the range of 0.5 percent by weight to 5 percent by weight of the total weight of the slip coat composition;
   a photoacid generator present in a range of 0.5 percent by weight to 5 percent by weight of the total weight of the slip coat composition; and
   hollow glass microspheres having a particles size range of 1 micrometer to 20 micrometers present in a range of 5 percent by weight to 10 percent by weight of the total weight of the slip coat composition;
   micronized silica having a particles size range of 1 micrometer to 20 micrometers, present in a range of 5 percent by weight to 15 percent by weight of the total weight of the slip coat composition; and
   an organic solvent present in the range of 40 percent to 50 percent by weight of the total weight of the slip coat composition.

2. The slip coat of claim 1, wherein the hollow glass microspheres and micronized silica in a weight ratio in the range of 0.5 to 1 to 0.7 to 1.

3. The slip coat of claim 2, wherein the polymer resin comprises a bisphenol-A epoxy resin; the flexibilizer comprises polyethylene glycol; the reactive diluent comprises triethylene glycol divinyl ether; the surface tension modifier comprises polyether modified polydimethylsiloxane; and the photoacid generator comprises triphenylsulfonium hexafluroantimonate.

4. The slip coat composition of claim 3, wherein the polyethylene glycol has a molar mass in the range of 380 nm to 420 nm.

5. The slip coat of claim 4, wherein the organic solvent comprises isopropyl alcohol.

6. The slip coat of claim 5, further comprising an optical brightener.

7. A gasket, comprising:
   a seal, wherein the seal includes an exposed surface; and
   a slip coat disposed on the exposed surface, wherein the slip coat includes the following slip coat composition:
      a polymer resin including at least one functional group curable upon exposure to ultraviolet radiation present in the slip coat in a range of 20 percent by weight to 25 percent by weight of the total weight of the slip coat composition,
      a flexibilizer present in a range of 1 percent to 20 percent by weight of the total weight of the slip coat composition,
      a reactive diluent present in a range of 2 percent by weight to 15 percent by weight of the total weight of slip coat composition,
      a surface tension modifier present in the range of 0.5 percent by weight to 5 percent by weight of the total weight of the slip coat composition,
      a photoacid generator present in a range of 0.5 percent by weight to 5 percent by weight of the total weight of the slip coat composition,
      hollow glass microspheres having a particles size range of 1 micrometer to 20 micrometers present in a range of 5 percent by weight to 10 percent by weight of the total weight of the slip coat composition,
      micronized silica having a particles size range of 1 micrometer to 20 micrometers, present in a range of 5 percent by weight to 15 percent by weight of the total weight of the slip coat composition, and
      an organic solvent present in the range of 40 percent to 50 percent by weight of the total weight of the slip coat composition, and
      at least a portion of the organic solvent has evaporated, and the slip coat composition is cured.

8. The gasket of claim 7, wherein the seal comprises a thermoplastic elastomer.

9. The gasket of claim 8, wherein the exposed surface of the seal exhibits a texture.

10. The gasket of claim 9, wherein the texture exhibits a depth in the range of 5 micrometers to 50 micrometers.

11. The gasket of claim 8, wherein the slip coat is in the range of 1 micrometer to 50 micrometers in thickness.

12. The gasket of claim 10, wherein the hollow glass microspheres and micronized silica are present at a ratio in the range of 0.5:1 to 0.7:1.

13. The gasket of claim 11, wherein the polymer resin comprises a bisphenol-A epoxy resin; the flexibilizer comprises polyethylene glycol; the reactive diluent comprises triethylene glycol divinyl ether; the surface tension modifier comprises polyether modified polydimethylsiloxane; and the photoacid generator comprises triphenylsulfonium hexafluroantimonate.

14. The gasket of claim 13, wherein the slip coat composition further comprises an optical brightener.

15. The gasket of claim 12, further comprising a base layer including a first channel defined therein, wherein the seal is retained in the first channel.

16. The gasket of claim 15, wherein the base layer comprises polypropylene.

17. A method of preparing a gasket, comprising:
injection molding with a textured mold cavity a seal, wherein the seal includes an exposed surface which exhibits a texture;
cleaning the exposed surface of the seal;
applying a slip coat composition; and
curing the slip coat composition,
wherein prior to curing the slip coat composition comprises:
- a polymer resin including at least one functional group curable upon exposure to ultraviolet radiation present in the slip coat in a range of 20 percent by weight to 25 percent by weight of the total weight of the slip coat composition,
- a flexibilizer present in a range of 1 percent to 20 percent by weight of the total weight of the slip coat composition,
- a reactive diluent present in a range of 2 percent by weight to 15 percent by weight of the total weight of slip coat composition,
- a surface tension modifier present in the range of 0.5 percent by weight to 5 percent by weight of the total weight of the slip coat composition,
- a photoacid generator present in a range of 0.5 percent by weight to 5 percent by weight of the total weight of the slip coat composition,
- hollow glass microspheres having a particles size range of 1 micrometer to 20 micrometers present in a range of 5 percent by weight to 10 percent by weight of the total weight of the slip coat composition,
- micronized silica having a particles size range of 1 micrometer to 20 micrometers, present in a range of 5 percent by weight to 15 percent by weight of the total weight of the slip coat composition, and
- an organic solvent present in the range of 40 percent to 50 percent by weight of the total weight of the slip coat composition.

18. The method of claim 17, further comprising evaporating at least a portion of the organic solvent.

19. The method of claim 18, wherein curing the slip coat composition includes exposing the slip coat composition to a UV light having at least one or more wavelengths in the range of 280 nm to 400 nm and at a dosage of 2,500 mJ/cm$^2$ to 3,500 mJ/cm$^2$.

20. The method of claim 18, wherein the slip coat composition includes an optical brightener and the method further comprises measuring the thickness of the slip coat composition after curing the slip coat composition by applying light in at least one wavelength in the range of 280 nm to 380 nm incident to the slip coat, and detecting light reflected from the cured slip coat composition by an optical sensor in at least one wavelengths in the range of 380 nm to 500 nm.

* * * * *